Dec. 27, 1938.  J. A. CATALANO  2,141,639
VEHICLE ROCKING DEVICE
Filed March 18, 1937  4 Sheets-Sheet 2

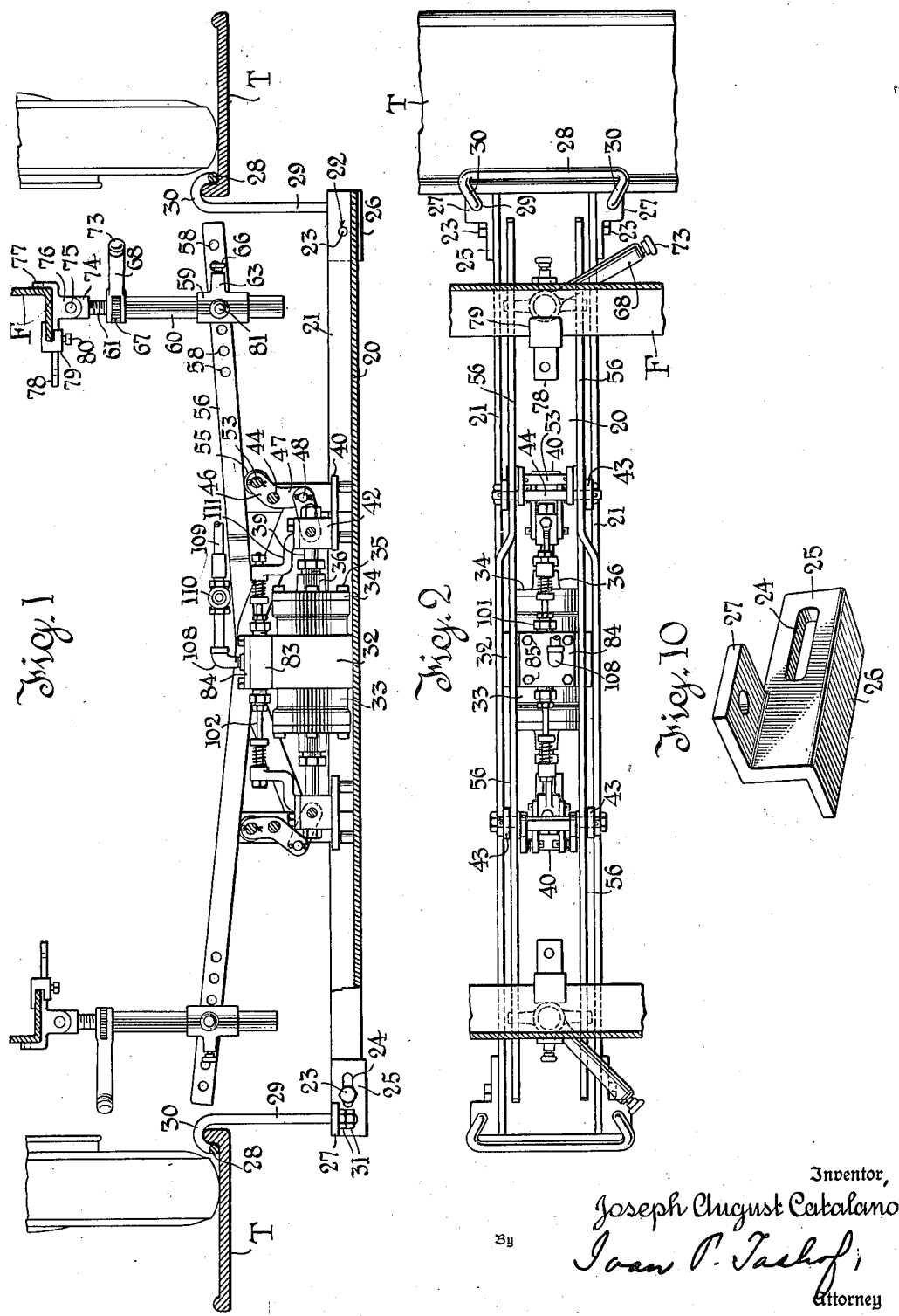

Inventor,
Joseph August Catalano,
By Ivan P. Tashof,
Attorney

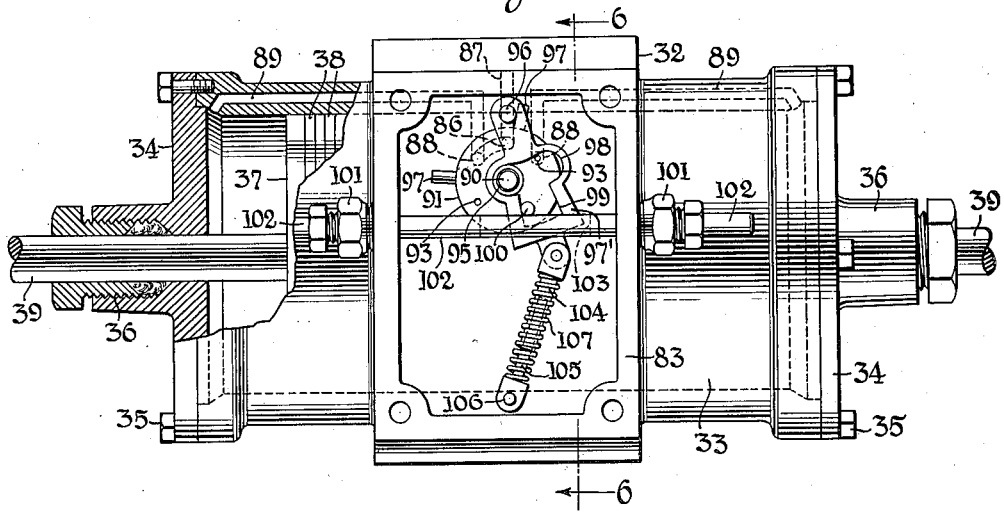
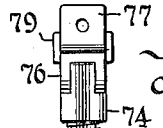
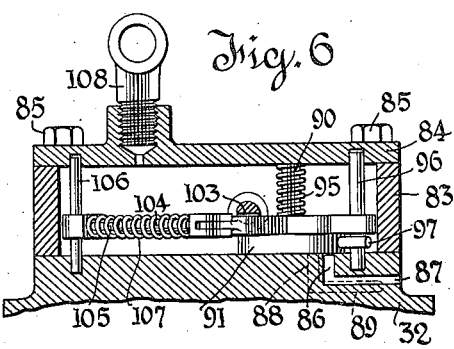
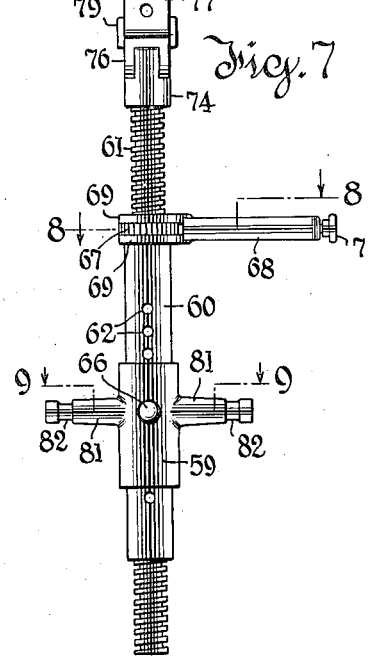
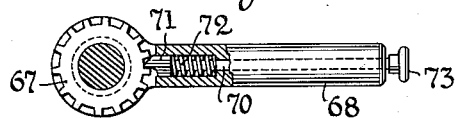
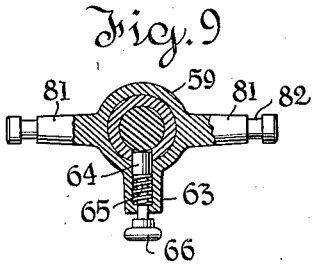

Dec. 27, 1938.  J. A. CATALANO  2,141,639
VEHICLE ROCKING DEVICE
Filed March 18, 1937   4 Sheets—Sheet 4
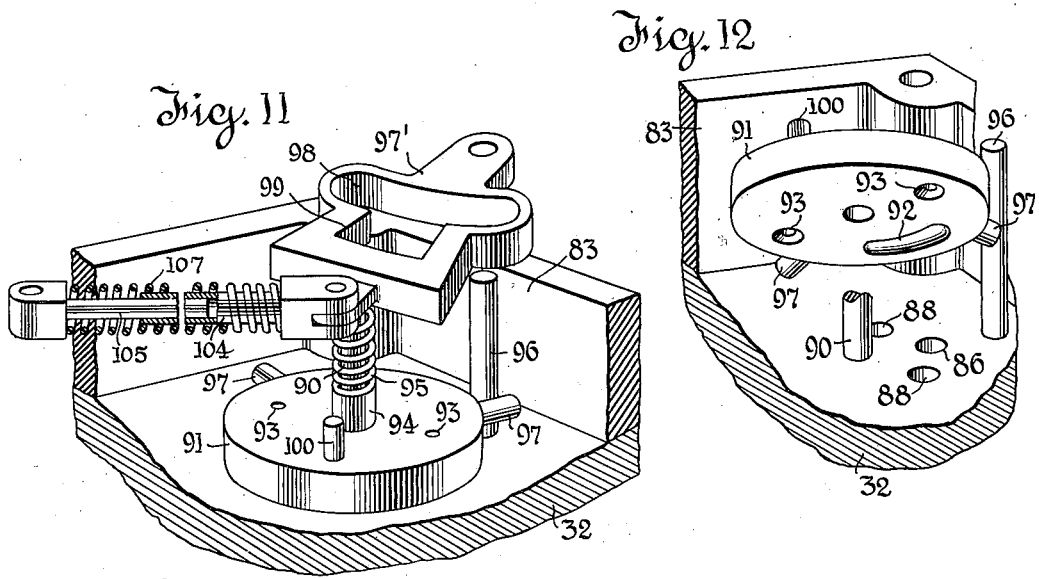
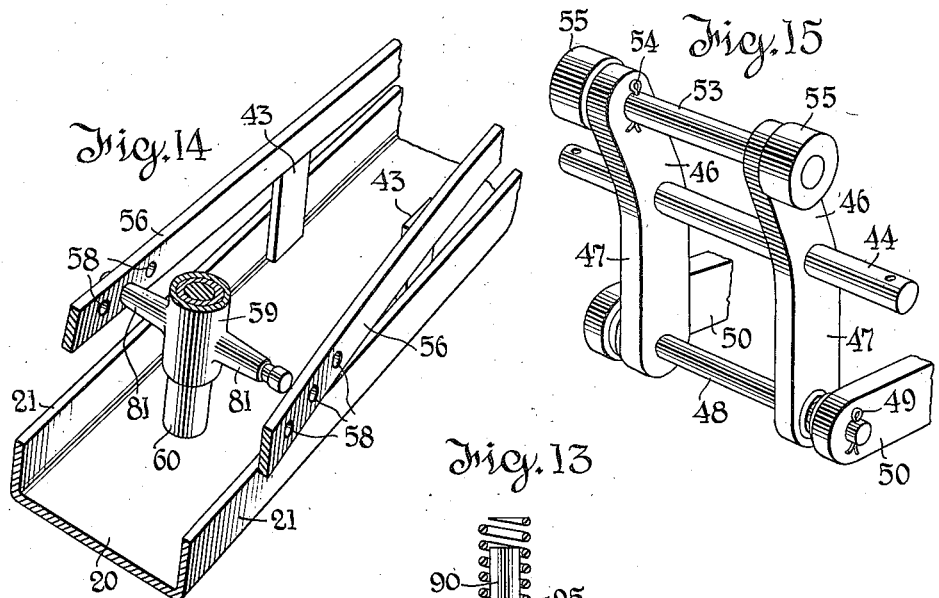
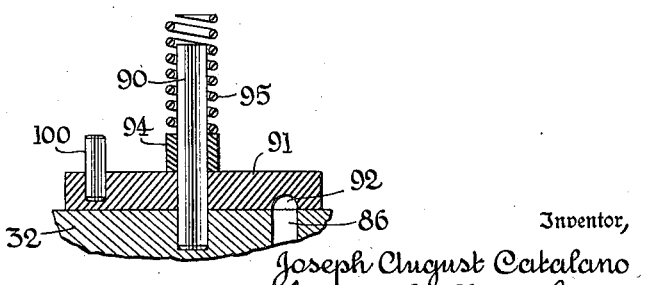
Inventor,
Joseph August Catalano
By Ivan P. Tashof,
Attorney Patented Dec. 27, 1938

2,141,639

UNITED STATES PATENT OFFICE 2,141,639

VEHICLE ROCKING DEVICE

Joseph August Catalano, New Orleans, La.

Application March 18, 1937, Serial No. 131,714

10 Claims. (Cl. 73—51)

This invention relates to vehicle rocking devices such as are used for rocking a motor vehicle or the like during the operation of oiling or greasing the springs and other parts of the vehicle.

One important object of the invention is to provide a novel apparatus of this character whereby a vehicle may be given simultaneous swaying and vibrating motions so that lubricant applied to relatively movable parts of the vehicle will properly penetrate between such parts and so that frictional squeaks will occur between worn or dry parts, thus audibly indicating that such parts require lubrication or renewal.

A second important object of the invention is to provide a novel mechanism of this character wherein the parts are so arranged that the device may be folded and packed to minimize space when the mechanism is not in use.

A third important object of the invention is to provide a novel mechanism for this purpose wherein a fluid pressure motor of novel construction is used for actuating the vehicle rocking elements.

A fourth important object of the invention is to provide a novel valve arrangement for controlling the actuation of such a fluid pressure motor.

A fifth important object of the invention is to provide a novel valve arrangement whereby excessive action, tending to dislodge the vehicle from the greasing rack, will be automatically prevented.

In devices of this character attempts have been made to provide rocking means engaging the longitudinal frame members of a vehicle but there is constant danger, unless proper means are provided, of the parts engaging such frame members becoming disengaged from the frames with consequent possibility of injury to the vehicle, the apparatus and to persons near the vehicle.

A sixth important object of the invention is to provide in a rocking device, novel means for engaging the longitudinal or other frame members of a vehicle, such means including safety devices preventing accidental disengagement of the means from the frame members.

A seventh important object of the invention is to provide a device of this kind having adjustable jacks for engaging the vehicle frame, these jacks being so attached to the mechanism that they can be detached therefrom with great ease.

With the above and other objects in view, as will be presently understood, the invention consists in general of certain novel combinations of elements and construction and arrangements of parts hereinafter fully described, illustrated in the accompanying drawings and particularly pointed out in the appended claims.

In the accompanying drawings like characters of reference indicate like parts in the several views, and:

Fig. 1 is a front elevation, partly in section, showing the apparatus in position for use, certain vehicle parts and sections of the rails of the greasing rack also being shown.

Fig. 2 is a plan view of the apparatus as shown in Fig. 1.

Fig. 5 is a fragmentary plan view, partly broken away and having the cover of the valve chest removed, the view disclosing the cylinder and certain of the associated parts.

Fig. 6 is a fragmentary section on the line 6—6 of Fig. 5.

Fig. 7 is an enlarged detail showing the assembly of one of the jacks used herein.

Fig. 8 is a section on the line 8—8 of Fig. 7.

Fig. 9 is a section on the line 9—9 of Fig. 7.

Fig. 10 is a detail perspective of a certain hanger bracket used herein.

Fig. 11 is a fragmentary perspective view of certain parts of the valve mechanism in partly disassembled positions.

Fig. 12 is a view similar to Fig. 11 with other parts disassembled.

Fig. 13 is a fragmentary section disclosing certain parts of the valve mechanism.

Fig. 14 is a fragmentary perspective disclosing the manner of attaching and detaching the jacks.

Fig. 15 is a greatly enlarged perspective showing a pair of the rocker levers used herein.

Figure 3:
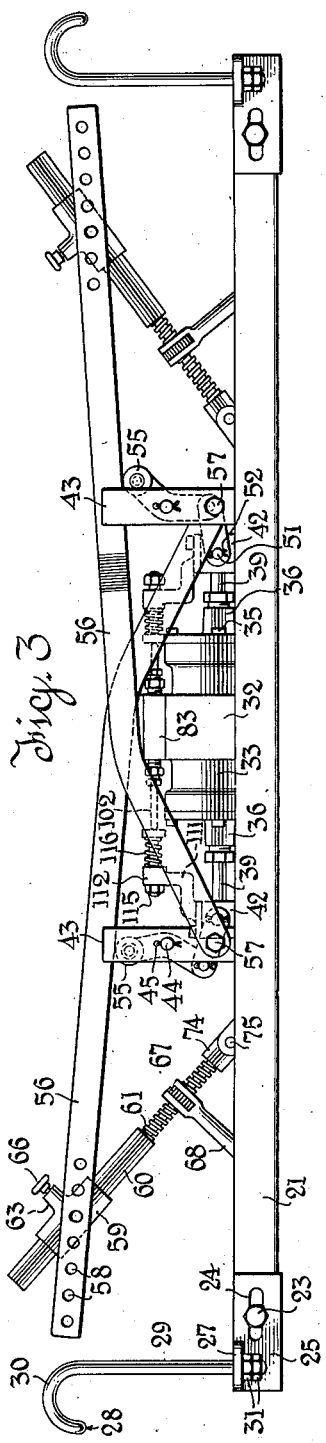
Fig. 3 is a side elevation of the apparatus with certain jacks forming parts thereof in storage positions.
Figure 4:
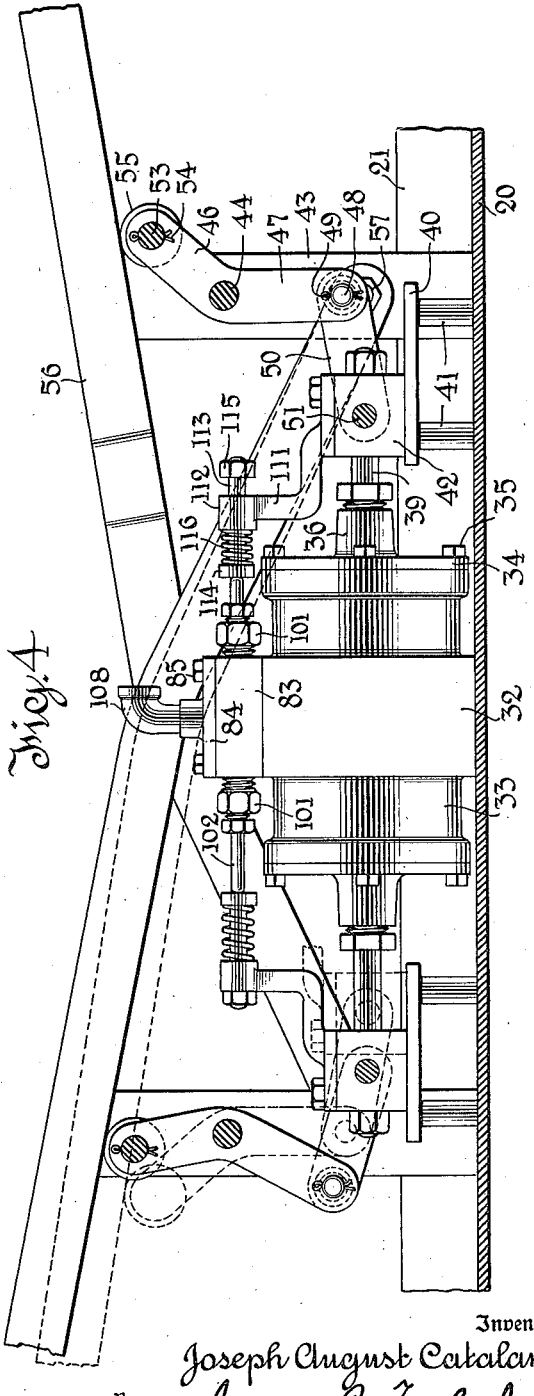
Fig. 4 is a fragmentary side elevation, partly in section, disclosing the rocking levers, one of which is shown in one position in full lines and in a second position in broken or dotted lines.

In the embodiment of the invention as herein disclosed, there is provided a base member of channel form having a horizontally disposed web 20 and upstanding side flanges 21. This channel is of sufficient length to span the space between the tracks of a greasing rack, such tracks being indicated in Figs. 1 and 2 at T. Adjacent each end of each flange 21 is a threaded hole 22 wherein is screwed a bolt 23, the bolt passing through a slot 24 formed in the vertical portion 25 of a hanger bracket. These brackets fit against the outer faces of the flanges 21. Each bracket has a bottom flange portion 26 which extends under the web 20 to keep the bracket from tilting on the bolt 23. Also each bracket has at its upper edge an outwardly extending ear 27. The brackets at each end of the base carry the hangers. Each of the hangers consists of a round bar bent to provide a central transverse portion 28 and a pair of legs 29 bent adjacent their junctions with portion 28 as at 30 to form a pair of hooks. The lower ends of the legs 29 extend through the ears 27 and carry the nuts 31 preventing upward withdrawal of the hangers. When in use the hooks 30 engage over the inner flanges of the tracks or rails T and thus support the base channel. The slots 24 permit adjustment of the hangers toward and from each other to suit variation in the spacing of the tracks T.

Located centrally of the upper side of the channel base and welded or otherwise secured to the web 20 and flanges 21 is a block 32 having a cylinder 33 formed integrally therewith and extending longitudinally of the base. Each end of this cylinder is closed by a head 34 secured by bolts 35. Each head carries a stuffing-box or gland 36. Reciprocable in the cylinder 33 is a piston 37 provided with the usual rings 38. A pair of piston rods 39 extend through the glands 36 and have their inner ends secured to the piston 37 as by screwing therein. A pair of guide plates 40 are supported in spaced relation to the cylinder 33 on posts 41 secured to the web 20. Secured to each rod 39 is a cross-head 42 which is in sliding relation to the respective guide 40. Standards 43 are arranged in pairs opposite each other and extend upwards alongside the flanges 21 to which they are welded or otherwise secured. The standards of each pair are connected by a tie-rod 44 which has its ends projecting through the standards and then secured by cotter-pins 45. Pivoted on each of the rods 44 is a pair of bell-crank levers having upwardly and outwardly extending arms 46 and downwardly extending arms 47. These levers form the rock levers of the apparatus. The lower ends of each pair of the arms 47 are connected by a rod 48 held in place by cotter pins 49.

Mounted on each rod 48 are the outer ends of a pair of links 50 which are pivoted to the adjacent crosshead 42 by pins 51 carrying cotter-pins 52. Connecting the upper ends of each pair of arms 46 is a rod 53 held in place by cotter-pins 54 and carrying on its outer ends rollers 55. Each of the standards 43 has pivoted thereto a jack supporting arm 56, the end of the arm being secured by a bolt 57 to the standard. Each arm 56 extends from its standard in an upwardly inclined direction towards the remote end of the base channel and rests on a roller 55 adjacent that remote end. These arms thus cross each other as clearly shown in Figs. 1 and 3. The free ends of each of the arms 56 are each provided with a series of spaced openings 58.

Each of the jacks used herein includes a sleeve 59 wherein is slidably mounted a sleeve 60. In the sleeve 60 is formed a series of longitudinally spaced pin holes 62. Projecting from the sleeve 59 is a hollow boss 63 wherein is a plunger 64 adapted to have its inner end engaged in a selected hole 62, the plunger being spring pressed inwardly by a spring 65, and being retractable by means of a finger grip 66. By this means, the sleeve 60 may be adjusted in the sleeve 59. On the screw 61 is an internally threaded ratchet 67 forming a nut for the jack screw 61. This ratchet nut cooperates with the top of sleeve 60 to adjustably support the jack. A tubular operating handle 68 is provided with a pair of fork arms 69 forming eyes which straddle the ratchet 67 and are rotatably mounted on the screw 61. Through the handle 68 extends a rotatable and reciprocable rod 70 having a pawl 71 on its inner end pressed by a spring 72 into engagement with the ratchet 67. The other end of the rod 70 is provided with an operating handle 73 by means of which the pawl may be rotated to have its beveled end face in desired direction so that oscillation of the handle may be caused to screw the screw 61 into or out of the sleeve 60. The free end of the screw 61 is swiveled to a socket 74 having laterally extending pins 75 whereon is pivoted the jack head 76. At one side of this jack head is an upstanding flange 77 while from the other side of the head extends an arm 78. A clip 79 is slidably mounted on the arm 78 and is held in adjusted position by a clamping bolt or screw 80. From Fig. 1 it will be seen that the flange 77 bears against the outer face of the frame member F of a vehicle while the clip 79 is adjusted to overlap the flange of the member F, thus securing the upper end of the jack against accidental displacement from the frame member by tightening the bolt or set screw 80. Extending in diametrically opposite directions from the sleeve 59 are a pair of journal arms 81 having grooves 82 adjacent their ends. These grooves 82 help to prevent the springing apart of arms 56 during normal operation, since the arms 56 are normally seated in the grooves 82. The pivotal mounting of the jack members is also effective to allow the jacks to be folded into the device when not in use, as shown in Fig. 3. It may be noted in this regard that if the jack handles 68 are made somewhat longer than shown, the jacks will be held in a horizontal position when folded in. In either case, the jacks when folded in, do not interfere with driving the car on and off of the tracks T. The arms 56 are sufficiently yielding to be sprung apart so that the arms 81 may be engaged in a suitable pair of the openings 58 so that the jacks may be adjusted in proper relation to the members F. This movement of the arms 56 is normally prevented by the upper portions of standards 43, since in normal operation the arms 56 never rise above the standards. The arms may be raised manually, however, to allow this springing of arms 56.

Mounted on the block 32 is a valve chest 83 having a cover 84 secured thereon by bolts 85. The top of the block 32 within the chest forms a flat surface. An exhaust port 86 communicates through a passage 87 with the external atmosphere. A pair of inlet and exhaust ports 88 lie on opposite sides of the port 86 and communicate through passages 89 with opposite ends of the cylinder 33, the ports 86 and 88 being spaced along an arcuate line centrally of which a port 90 is fixed in the block. Rotatably mounted on the port 90 is a circular valve disk 91 having an arcuate groove or passage 92 on its under side, the groove 92 being so arranged that in one position of the valve 91 one port 88 will be connected with the port 86 and in a second position of the valve the other port 88 is so connected. The disk 91 is also provided with a pair of ports 93 having small openings through the upper surface of the disk so as to restrict the flow of air through these ports. These ports are so positioned that when one port 88 is in communication with port 86, the other port 88 has a port 93 in registry therewith. On the post 90 is a collar 94 which bears on the upper surface of the valve 91 and a coiled compression spring 95 surrounds this post above the collar and bears at its upper end against the cover 84 (see Fig. 6). Extending up from the block 32 is a stop pin 96 and extending radially from the valve 91 is a pair of stop arms 97 which engage selectively with the pin 96 to ensure proper registration of the various parts in the two extreme positions of the valve. Oscillatably mounted on the stop pin 96 is a valve actuating frame 97' which lies on top of the valve 91 and has a slot portion 98 receiving the collar 94, and a further slot portion 99 adjacent its free end. A valve actuating pin 100 extends upwardly from the valve into the slot portion 99. The opposite ends of the valve chest are provided with stuffing boxes 101 aligned with each other to receive a valve stem 102 having a cut-away portion 103 providing shoulders between which the free end of the frame 97 is engaged so that reciprocation of the valve stem oscillates the frame.

A sleeve 104 is pivoted at one end to the free end of the frame 97' and receives in its other end a plunger 105 which has its outer end pivoted on a pin 106 projecting up from the block 32. There is thus a telescopic connection between the pin 106 and the free end of the frame 97 and a compression spring 107 surrounds this connection and urges it to expanded position.

The valve cover 84 is provided with a suitable connection 108 for an air hose 109 or the like, for supplying fluid under pressure to the valve chest and an ordinary stop valve 110 is connected in the line for controlling admission of the fluid to the valve chest.

Bolted to each cross-head 42 is an upstanding bracket 111 having a sleeve 112 at its upper end. Through each sleeve 112 extends a rod 113 which aligns with the valve stem 102 and has a head 114 which engages the end of said stem. A nut 115 is carried on the outer end of each rod 113 to limit the movement of the rod through its sleeve in one direction and a spring 116 surrounds the rod between its head and the sleeve and urges the head into engagement with the valve stem.

In operation the apparatus is hung on the tracks or rails T and the jacks adjusted to engage the frame members F and screwed up to take at least part of the weight off of the vehicle springs. The valve 110 is now opened. Suppose the parts to be in the position shown in Fig. 5 and air under pressure to fill the valve chest. Air will now pass through the right hand ports 93 and 88 and passage 89 to the right hand end of the cylinder so that the piston will move to the left, air from the left hand end of the cylinder being exhausted through port 86 and passage 87. The cross-heads move to the left and this causes the valve stem 102 to move similarly. When the frame 97' has moved to bring the telescopic members 104, 105 into alignment with the port 86, further movement will result in the frame snapping over to the left, the cut-away slot 103 being of proper length to permit this. The frame, in so moving will engage the pin 100 and kick the valve around to open communication between the valve chest and left hand end of the cylinder and between the right hand end of the cylinder and the atmosphere. Consequently, the piston will now move to the right until the valve position is again changed at the end of the right hand stroke. As these reciprocations of the piston occur, the cross-heads will reciprocate and, through the links 52, the rocker arms will be oscillated to alternately raise and lower the arms 56 and thus rock and shake the vehicle.

It may be noted that due to the pivotal connection of the jacks to the arms 56, the vehicle is given a combined rocking and swaying motion. This rocking and swaying motion is quite beneficial during the greasing operation.

What is claimed is:

1. In a vehicle rocking device, an elongated base member, means at the ends of said member for suspending the member from a vehicle greasing rack, independent arms each pivoted at one end to said member for independent pivotal movement, means carried by the free ends of said arms and adapted to engage vehicle frame members, levers pivotally supported from said base member and having means engaging said arms to raise and lower the free ends of the arms as the levers are oscillated, and a fluid pressure motor operatively connected to said levers to oscillate the same.

2. In a vehicle rocking device, an elongated base member, suspension means at the ends of said member for suspending the member from a vehicle greasing rack, independent arms each pivoted at one end to said member for independent pivotal movement, jacks carried by the free ends of said arms and adapted to engage vehicle frame members, levers pivotally supported from said base member and having means engaging said arms to raise and lower the free ends of the arms as the levers are oscillated, a cylinder positioned between said levers, a piston reciprocable in said cylinder, piston rods extending in opposite directions from said cylinder, and operative connections between said piston rods and levers.

3. In a vehicle rocking device, an elongated base member, suspension means at the ends of said member for suspending the member from a vehicle greasing rack, independent arms each pivoted at one end to said member for independent pivotal movement, jacks carried by the free ends of said arms and adapted to engage vehicle frame members, clamping clips carried by said jacks for holding the jacks in engagement with the vehicle frame, levers pivotally supported from said base member and having means engaging said arms to raise and lower the free ends of the arms as the levers are oscillated, and a fluid pressure motor operatively connected to said levers to oscillate the same.

4. In a vehicle rocking device, an elongated base member, suspension means at the ends of said member for suspending the member from a vehicle greasing rack, independent arms each pivoted at one end to said member for independent pivotal movement, jacks carried by the free ends of said arms and adapted to engage vehicle frame members, clamping clips carried by said jacks for holding the jacks in engagement with the vehicle frame, levers pivotally supported from said base member and having means engaging said arms to raise and lower the free ends of the arms as the levers are oscillated, a cylinder positioned between said levers, a piston reciprocable in said cylinder, piston rods extending in opposite directions from said cylinder, and operative connections between said piston rods and levers.

5. In a vehicle rocking device, an elongated base member, suspension means at the ends of said base member for suspending the member from a greasing rack, said means being adjustable longitudinally of the base member, means to secure the suspension means in adjusted position, pairs of standards extending upwardly from said base member at opposite sides of the center of the member, independent jack supporting arms connected to said standards and extending in an upwardly inclined direction toward the remote ends of said base member, bell crank levers pivoted intermediate their ends to said standards and each having an upwardly inclined arm carrying a roller whereon a jack supporting arm rests, and a fluid pressure motor connected to the remaining arms of said bell crank levers to oscillate the levers.

6. In a vehicle rocking device, an elongated base member, suspension means at the ends of said base member for suspending the member from a greasing rack, said means being adjustable longitudinally of the base member, means to secure the suspension means in adjusted position, pairs of standards extending upwardly from said base member at opposite sides of the center of the member, independent jack supporting arms connected to said standards and extending in an upwardly inclined direction toward the remote ends of said base member, bell crank levers pivoted intermediate their ends to said standards and each having an upwardly inclined arm carrying a roller whereon a jack supporting arm rests, a cylinder positioned between said levers, a piston reciprocable in said cylinder, piston rods extending in opposite directions from said cylinder, and operative connections between said piston rods and levers.

7. In a vehicle rocking device, a supporting member, means mounted on said member for substantially vertical movement, said means including a pair of independent elongated laterally spaced arms each pivoted to said supporting member adjacent one end of the supporting member for independent pivotal movement and extending along the member to terminate adjacent the other end of said member, means for moving said first mentioned means, means pivotally mounted on said elongated arms, and means for connecting said pivotally mounted means to a portion of the vehicle being rocked, said elongated arms and said means for connecting said pivotally mounted means being so proportioned that the means for connecting said pivotally mounted means can be folded into the space between said arms when the rocking device is not in use.

8. A vehicle rocking device, an elongated base member, means at the ends of said member for suspending the member from a vehicle greasing rack, independent arms each pivoted for independent pivotal movement at one end to said member adjacent a respective end of the member and extending along said member to terminate adjacent the opposite end of the member, means carried by the free ends of said arms and adapted to engage vehicle frame members, means pivoted on said base member and having means engaging said arms to raise and lower the free ends of the arms as the pivoted means is oscillated, and means for oscillating said pivoted means.

9. In a vehicle rocking device, an elongated base member, pairs of standards extending upwardly from said base members at opposite sides of the center of the member, independent jack supporting arms pivotally connected to said standards for independent pivotal movement and extending in an upwardly inclined direction toward the end of the base member opposite the side of its respective standard, bell crank levers pivoted intermediate their ends to said standards and each having an upwardly inclined arm carrying a roller whereon a jack supporting arm rests, and means for simultaneously actuating said bell crank levers.

10. In a vehicle rocking device, a supporting member, means pivotally mounted on said member for substantially vertical swinging movement, means for moving said first mentioned means, means pivotally mounted on said first mentioned means for free vertical swinging movement, and means for connecting said pivotally mounted means to a portion of the vehicle being rocked, said last mentioned means constituting a clamp pivotally connected to said last mentioned pivotally mounted means.

JOSEPH AUGUST CATALANO.